United States Patent

Tirumalai

[11] Patent Number: 5,611,732
[45] Date of Patent: Mar. 18, 1997

[54] FLEXIBLE COUPLING WITH END STRESS RELIEF STRUCTURE

[75] Inventor: Suresh S. Tirumalai, Chambersburg, Pa.

[73] Assignee: TB Wood's Incorporated, Chambersburg, Pa.

[21] Appl. No.: 512,137

[22] Filed: Aug. 7, 1995

[51] Int. Cl.⁶ .................................................. F16D 3/58
[52] U.S. Cl. ............................ 464/80; 464/51; 464/88
[58] Field of Search .......................... 464/80, 79, 75, 464/51, 87, 88, 89, 147; 285/220, 221, 223, 291

[56] References Cited

U.S. PATENT DOCUMENTS

| | | | |
|---|---|---|---|
| 1,983,094 | 12/1934 | Neher | 464/79 X |
| 3,063,261 | 11/1962 | Sorenson | 464/80 |
| 3,137,149 | 6/1964 | Schlotmann | 464/80 |
| 3,524,332 | 8/1970 | Callies | 464/80 |
| 3,747,366 | 7/1973 | Ruggen et al. | 464/80 |
| 4,171,920 | 10/1979 | Kramer et al. | 464/88 X |
| 4,312,193 | 1/1982 | Gibbs | 464/88 |
| 4,634,400 | 1/1987 | Butzow et al. | 464/92 X |
| 4,645,473 | 2/1987 | Mochizuki | 464/79 |

*Primary Examiner*—Daniel P. Stodola
*Assistant Examiner*—William A. Rivera
*Attorney, Agent, or Firm*—Frank S. Troidl

[57] ABSTRACT

Two semi-annular members form an annular coupling. Each semi-annular member has a flexible center. A semi-annular shoe extends from each axial end of the flexible center. The shoes are bonded to the flexible center. The circumferential ends of the shoes have an axially extending cut-out embedded in the flexible center.

4 Claims, 1 Drawing Sheet

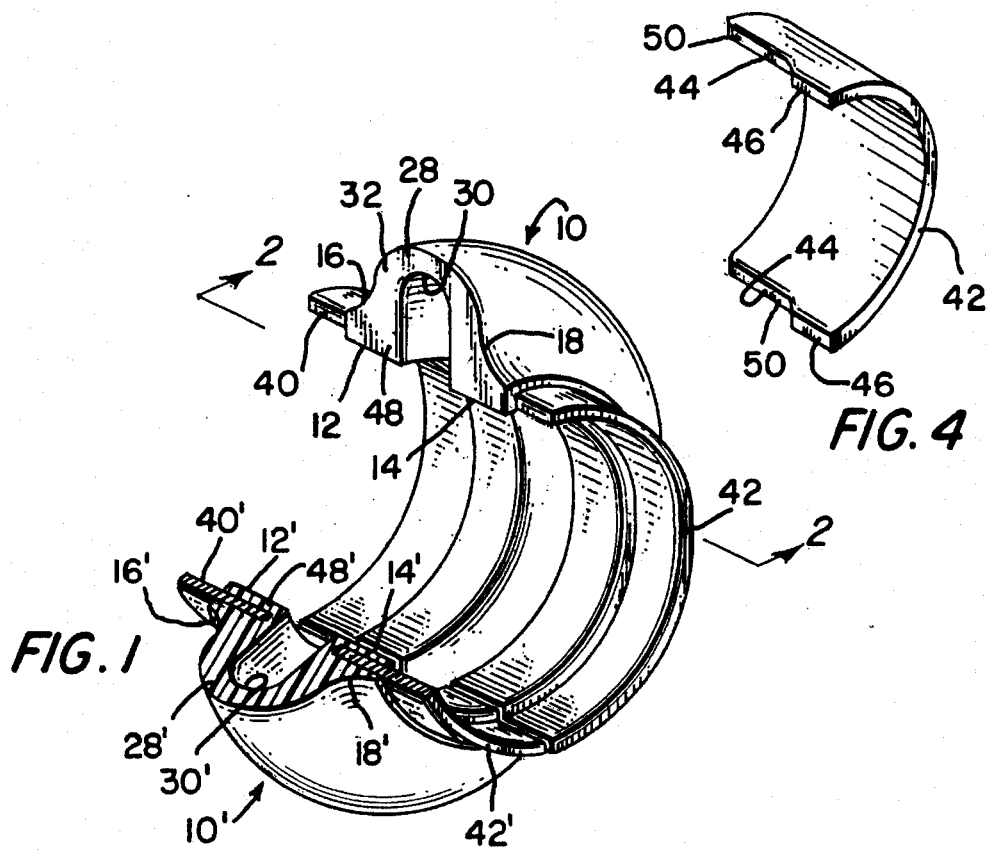
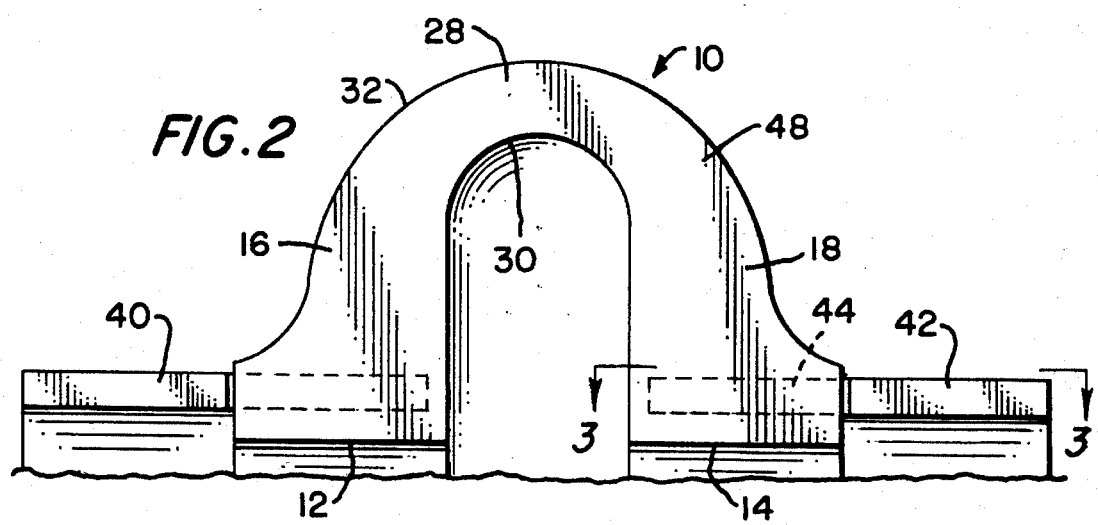
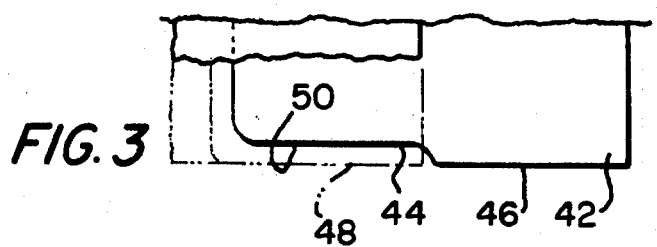

FLEXIBLE COUPLING WITH END STRESS RELIEF STRUCTURE

BACKGROUND OF THE INVENTION

This invention relates to couplings for joining a driving shaft and a driven shaft which are approximately aligned on a central axis. More particularly, this invention is a flexible annular coupling made up of at least two members in the form of sectors of an annulus.

A flexible elastomeric coupling connects the shafts of rotating equipment. It is primarily made up of a center flexible elastomeric member bonded to a steel shoe on each axial end. The elastomeric member is usually made of a synthetic material, such as rubber, urethane, or their derivatives. Connection between the shafts is established by attaching the steel shoes of the coupling to hubs mounted on the shafts. The main requirement of a coupling is to transmit power from the driving shaft to the driven shaft, smoothly and efficiently, with minimum loss and fluctuations. It should also be capable of accommodating different loads and shaft misalignments produced by the equipment it is connected to, and at the same time, provide enough damping to absorb fluctuations in loads. Some of the major loads that have been identified are-torsional, axial and radial loads. Torsional loads have two components- impulse or shock loads, produced during startup of the equipment, and steady state loads, produced when the equipment is running. These loads are dynamic in nature and vary with the type of equipment being used and the magnitude of misalignment between the shafts connecting the coupling. Axial and radial loads are normally caused due to misalignment between shafts connecting the coupling, and produce (1) large vibratory forces during startup and running/loading of the equipment (2) fatigue loads on the elastomeric element, due to repeated radial and axial flexing. High tensile and compressive forces, acting at different angles, are produced in the elastomer.

When the shaft is in motion, a combination of the above dynamic loads act on the coupling, causing the elastomeric element to flex. The amount of flex is proportional to the magnitude of the forces acting on the coupling. Since the behavior of the elastomeric material is non-linear in nature, for any given cross-section of the elastomer in a three dimensional plane, the amount of flex varies with the geometry of the elastomer and the direction of shaft forces. The flexing of the elastomer causes three dimensional shear, tensile and compressive stresses which may be either distributed or localized across the cross-section, at different planes, depending on the geometry. An ideal coupling would be one in which the stresses are distributed uniformly across the cross-section of the elastomer. Localized stress zones tend to magnify the stresses and are sensitive to load fluctuations caused by torque and misalignment. The elastomer in these areas is constantly subject to repeated tensile and compressive stresses, much higher than the average stress values, causing it to fail prematurely.

It has been observed that the behavior of the elastomeric material changes significantly with the change in geometry and cross-section, and is non-linear in nature. The coupling is usually made up of two halves and is therefore discontinuous. High shear stress zones are caused across the circumferential end faces of the elastomer. Also, high peel stresses are caused at the bond line which are proportional to the applied torque. Using thicker elastomer cross-section to offset the high shear stress zones does not always give better results, but on the contrary, may form localized high stress zones, causing the material to fail prematurely, or cause higher peel stresses in the bond line, causing bond failure. Also, it has been observed that for most cross-sections the stresses in the elastomer tend to peak near the shoe area of the coupling, the maximum concentration being just slightly above the shoe, decreasing gradually as you move away from the shoe-elastomer interface. These stresses vary with the geometry of the elastomer, especially near the shoe area, and are mainly caused due to unequal stretching of the elastomer, stretch/stress propagation between the elastomer and steel at the shoe area is very low and uneven. This causes high stress zones in the elastomer and at the bond line resulting in fatigue and bond failures. Away from the shoe area, the stretch propagation across the elastomer is more or less uniform and the stress distribution is somewhat normal, depending upon the geometry of the elastomer.

U.S. Pat. No. 4,634,400 dated Jan. 6, 1987 in the name of Niel W. Butzow, et. al. shows and describes a flexible coupling made of two halves with the circumferential end faces made with a particular structure in an attempt to distribute the stress evenly across the cross-section, and away from the shoe. Nevertheless, the coupling described by the Butzow, et. al. patent develops high stress concentrations at the bond line and certain areas of the elastomer above the bond line, These stresses cause the coupling to fail, either due to fatigue in the elastomer or failure of the bond.

The foregoing illustrates limitations known to exist in present devices and methods.

Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing an annular coupling comprising at least two members in the form of sections of an annulus. Each member has a flexible center having two axially extending axially separated bases and a side wall radially extending from each base. The thickness of each side wall tapers radially outwardly from each base. An axially extending outer wall having fully curved inside and outside surfaces interconnects the side walls. The radius of curvature of the fully curved inside surface and the radius of curvature of the fully curved outside surface are such that the thickness of the wall tapers radially outwardly. The side walls, outer wall, and the bases form a hollow cross-sectional shape having circumferential ends. The radial cross-sectional area of the flexible center is the same along its entire circumferential length.

In another aspect of the invention, this is accomplished by providing an annular coupling comprising at least two members in the form of sectors of an annulus. Each member has a flexible center with two axially separated portions and circumferential ends. A metal shoe is bonded to each separated portion. Each circumferential end of each shoe has an axially extending cut-out embedded in a separated portion.

This invention provides a coupling which (1) allows the stresses to be more uniformly distributed across the elastomer, (2) eliminates localized high shear stress areas in the elastomer, (3) greatly reduces the relative shear stresses near the bond line of the elastomer and the steel shoe, (4)

improves the overall durability of the coupling, (5) allows the top of the elastomer to be flexed more them the sides, thereby moving high stress concentration areas away from the bond line, and (6) provides a low stress buffer zone between the bond and the elastomer that reduces the bond line stresses.

The foregoing and other aspects will become apparent from the following detailed description of the invention when considered in conjunction with the accompanying drawing figures.

BRIEF DESCRIPTION OF THE DRAWING FIGURES

FIG. 1 is a perspective view, in partial section, of the coupling of the present invention;

FIG. 2 is a front elevational view of one section of the coupling, on an enlarged scale, taken along line 2—2 of FIG. 1;

FIG. 3 is a partial sectional view taken along line 3—3 of FIG. 2; and

FIG. 4 is a perspective view of a metal shoe forming part of the coupling of the present invention.

DETAILED DESCRIPTION

In the various figures, like parts are referred to by like numbers and the mark (') is used to distinguish a part from another part of the same structure.

Referring to the drawings, and more particularly to FIG. 1 and FIG. 2, a coupling for joining adjacent ends of a driving shaft (not shown) and a driven shaft (not shown) which are approximately aligned on a central axis is shown. In the embodiment shown, there are two semiannular members which when their circumferential end faces are placed close to one another with a very small gap separating them, form the annular coupling.

Referring to FIG. 2, the flexible center 10 has two axially extending axially separated bases 12 and 14. The flexible center 10 is preferably made of an elastomeric material such as urethane. Side wall 16 and side wall 18 extend radially from the base 12 and the base 14, respectively. The side wall 16 has a thickness which tapers radially outwardly from base 12. The side wall 18 has a thickness which tapers radially outwardly from base 14.

An axially extending outer wall 28 interconnects side walls 16 and 18. Outer wall 28 has a fully curved inside surface 30 and a fully curved outside surface 32. The radius of curvature of the fully curved inside surface 30 and the radius of curvature of the fully curved outside surface 32 are such that the thickness of the outer wall 28 tapers radially outwardly from side walls 16 and 18. Bases 12 and 14, walls 16 and 18, and outer wall 28 form a flexible center 10 which has the same radial cross-sectional area along its entire circumferential length.

Referring to FIG. 2 and FIG. 3, a semi-annular steel shoe 40 extends axially from the base 12. A semi-annular steel shoe 42 extends axially from base 14. Shoes 40 and 42 are bonded to the bases 12 and 14, respectively.

Referring to FIG. 3 and FIG. 4, the semi-annular shoe 42 has a cut-out 44 extending axially from the axial inner end of the semi-annular steel shoe 42, Thus, the cut-out provides a semi-annular shoe with a circumferential end portion 46 in-line with the circumferential end 48 of the flexible center 10 and a circumferential end portion 50 circumferentially spaced from the circumferential end of the flexible center 10.

In the embodiment shown, the cut-out 44 is completely embedded in flexible center base 14 so that the entire circumferentially spaced portion 50 is completely embedded in flexible center base 14.

As shown in FIG. 4, the other circumferential end of metal shoe 42 has a cut-out of the same structure as cut-out 44. Also, both circumferential ends of the other three shoes in the coupling have a cut-out of the same structure as cut-out 44.

With the structure of this invention, the stresses at the bond line are greatly reduced and localized shear stress zones are eliminated. The structure of the walls 16 and 18 and the interconnecting wall 28 is such that a stress relief zone is provided between the shoe and the center of the wall section. This zone acts as a buffer between the high shear stress zone near the bond line and the normal shear stress zone at the walls and the top of the elastomer, preventing stress propagation between the high shear stress and the normal shear stress zones. With the structure of this invention, a much more evenly distributed stress is provided in the elastomer 10. A great deal more of the stress is distributed in the top wall 28 between the inside fully curved surface 30 and the outside fully curved surface 32 than has previously been obtained by other similar types of couplings.

Additional stress relief near the elastomer-shoe bond area has been provided by the cutouts at the circumferential ends of the steel shoes. With the cut-out portion there is no steel-elastomer interface at that point. Therefore, there is no tearing of the elastomer from steel. Thus, the stress pattern is more uniform at the shoe area thereby reducing the peel stresses caused at the bond line and the stresses are redistributed so that there is no longer any high localized stress at the elastomer-shoe interface.

Having described the invention, what is claimed is:

1. An annular coupling for joining adjacent ends of two shafts that are approximately aligned on a central axis comprising:

at least two members in the form of sectors of an annulus, each member comprising;

a flexible center having two axially separated radially extending portions and two circumferential ends, the two axially separated radially extending portions being interconnected by an axially extending outer wall; and a metal shoe bonded to each of said two axially separated radially extending portions, each metal shoe having two circumferential ends, each of said two circumferential ends of each metal shoe having an axially extending cut-out at least partially embedded in an axially separated radially extending portion, the cut-outs being located to provide said metal shoe bonded to each of said two axially separated radially extending portions and having two circumferential ends with each circumferential end having an axially extending portion approximately in-line with the corresponding circumferential end of the flexible center and an axially extending portion circumferentially spaced from the corresponding circumferential end of the flexible center.

2. An annular coupling in accordance with claim 1 wherein:

each cut-out extends axially from the inner axial end of each metal shoe.

3. An annular coupling in accordance with claim 2 wherein:

each cut-out is completely embedded in the corresponding radially extending portion.

4. An annular coupling for joining adjacent ends of two shafts that are approximately aligned on a central axis comprising:

at least two members in the form of sectors of an annulus, each member comprising;

a flexible center having two axially extending axially separated bases and a side wall radially extending from each base, the thickness of each side wall tapering radially outwardly from each base, an axially extending outer wall having fully curved inside and outside surfaces interconnecting said side walls, the radius of curvature of the fully curved inside surface and the radius of curvature of the fully curved outside surface being such that the thickness of the outer wall tapers radially outwardly, said walls and said bases forming a hollow cross-sectional shape having two circumferential ends, the radial cross-sectional area of the flexible center being substantially the same along its entire circumferential length;

each of said at least two members also having a metal shoe bonded to each of said two axially extending axially separated bases and extending axially from each base, each shoe having two circumferential ends, each of said two circumferential ends having a cut-out extending axially from the inner axial end of the shoe, the cut-outs being located to provide said metal shoe bonded to each of said two axially extending axially separated bases and each shoe having two circumferential ends with each circumferential end having an axially extending portion approximately inline with the corresponding circumferential end of the flexible center and an axially extending portion circumferentially spaced from the corresponding circumferential end of the flexible center, the entire circumferentially spaced portion being completely embedded in a flexible center base.

* * * * *